United States Patent
Sutton

(10) Patent No.: US 7,055,138 B2
(45) Date of Patent: May 30, 2006

(54) TEST EXECUTIVE SYSTEM WITH TREE STRUCTURE FOR SUMMARIZING RESULTS

(75) Inventor: Christopher K Sutton, Everett, WA (US)

(73) Assignee: Agilent Technologies, Inc., Palo Alto, CA (US)

( * ) Notice: Subject to any disclaimer, the term of this patent is extended or adjusted under 35 U.S.C. 154(b) by 847 days.

(21) Appl. No.: 10/000,600

(22) Filed: Oct. 23, 2001

(65) Prior Publication Data

US 2003/0078679 A1 Apr. 24, 2003

(51) Int. Cl.
G06F 9/45 (2006.01)

(52) U.S. Cl. ............................. 717/125; 702/58; 714/38
(58) Field of Classification Search ................. 717/125, 717/126; 702/58; 714/38

See application file for complete search history.

(56) References Cited

U.S. PATENT DOCUMENTS

| | | | |
|---|---|---|---|
| 5,390,131 A | | 2/1995 | Rohrbaugh et al. |
| 5,428,624 A | * | 6/1995 | Blair et al. .................. 714/727 |
| 6,067,639 A | * | 5/2000 | Rodrigues et al. ............. 714/38 |
| 6,154,128 A | * | 11/2000 | Wookey et al. ............. 340/506 |
| 6,698,012 B1 | * | 2/2004 | Kossatchev et al. ........ 717/126 |
| 6,823,272 B1 | * | 11/2004 | Sutton .......................... 702/58 |

FOREIGN PATENT DOCUMENTS

WO    WO 99/47937    9/1999

OTHER PUBLICATIONS

National Instruments, "TestStand–A Complete Test Executive Environment," National Instruments, p. 55–60 (Mar., 2000).
Hansen P: "The World Wide Web Leads a Revolution in ATE Programming Environments", 1997 Autotestcon Proceedings: IEEE Systems Readiness Technology Conference, Anaheim, Sep. 22–25, 1997, Autestcon Proceedings: IEEE Systems Readiness Technology Conference, New York, IEEE, US, vol. CONF. 33, Sep. 1997, pp. 165–169, XP002107206, ISBN: 0–7803–4163–5.

* cited by examiner

Primary Examiner—John Chavis

(57) ABSTRACT

An electronic test system with a multi-level tree structure for summarizing the results of the test. The levels of the tree correspond to the hierarchical levels in the execution of a test procedure. The highest level, or first level, represents the result for the whole test procedure. Level two represents the results of various tests. Level three represents the results of various measurements performed in a test, and level four represents the results for various datapoints for a given measurement. Preferably, each level in the tree structure is characterized by a graphical element. The graphical element provides the information on the status of the result at that level. In the tree structure, the results at a higher level are determined by summarizing the results at the adjacent sub-level.

31 Claims, 5 Drawing Sheets

TEST EXECUTIVE SYSTEM WITH TREE STRUCTURE FOR SUMMARIZING RESULTS

BACKGROUND OF THE INVENTION

1. Field of the Invention

The present invention relates to electronic systems for performing automated tests of complex electronic, electromechanical and mechanical equipment and products. More particularly, the present invention relates to an electronic test system with a tree structure for summarizing the results of the test.

2. Statement of the Problem

Test systems are used to check the status and performance of complex electronic, electromechanical and mechanical products and equipment. Such tests can include validation tests which run through the various operations that the device under test (DUT) is capable of and records whether each operation was performed properly; environmental tests which expose the DUT to various combinations of temperature, pressure, and humidity, and records the results; production tests, etc. Generally, both the DUT and the systems providing the environmental and other constraints on the DUT are controlled electronically. In the last decade or so, computerized programs which are capable of controlling a variety of automated tests, referred to in the art as "test executive" programs, have been developed.

Tests usually are defined by a set of rules or specifications to which the DUT is compared. The rules or specifications generally comprise various inputs defined by electrical and mechanical parameters applied to the DUT, such as voltage, current, specified manipulations of controls and device parts, as well as environmental parameters under which the test is conducted, such as temperature, humidity, pressure, and the time period over which a parameter is applied. Each test will include many combinations of the parameters applied to each element of the DUT, and often will be repeated many times. Thus, as equipment and products become more complex, electronic test programs have become very long and complex, often requiring several days, or even a week or more to run a complete test.

Test executive programs in the prior art include internal test executive programs developed by Agilent Technologies and TESTSTAND software developed by National Instruments Corporation, which is described as a ready-to-run test executive for organizing, controlling, and executing automated prototype, validation, or production test systems. The prior art Agilent Technologies programs did not use a graphical user interface, and thus it was usually tedious to examine the complete results of a test. The TESTSTAND software showed the results in a spreadsheet structure that was not easy to analyze. The prior art software at best was limited to showing the results of a given measurement by colored text such as "passed" in blue color, "skipped" in yellow color and "failed" in red color. Therefore, it takes significant time to scan textual results to determine what further action is needed. When a test fails, it is usually necessary to examine the details of the test further to find the source of the failure before taking further action. Therefore, it would be highly desirable to have a test executive system in which test results are more easily selected and analyzed.

SUMMARY OF THE INVENTION

The present invention solves the above and other problems in the prior art by allowing the user to see the results of the test on a display in a form of a hierarchical tree structure. That is, the results are displayed in a multilevel structure having a highest level and one or more sublevels. In each branch of the tree, the results are summarized from each sublevel to the next highest level. That is, if a selected result is recorded at a sublevel, this result is passed up to the next level, which displays the result. Thus, a high-level scan of the test results will quickly show the selected result.

A tree structure is any structure organized in the manner of the branches of a tree. That is, a tree is organized as a trunk, to which one or more branches are attached. Each branch in turn has one or more sub-branches attached to it, and so forth, until we reach the level of a twig, which has no additional branches, attached. Whether the "trunk" or the "twig" is considered the highest or lowest level is arbitrary. In this disclosure, we shall consider the main level, or trunk, the highest level, and lower levels will be considered as sub-levels of the next higher level. Thus, a tree structure is a hierarchical configuration having multiple levels, with each sub-level having a number of entries equal to or greater than the next higher level. Preferably, the user can "click" on a branch to open a level and see where the branch leads.

The levels of the tree structure according to the invention preferably correspond to the hierarchical levels in the execution of a test procedure. The highest level, which we shall refer to as the first or top level, represents the result for the whole test procedure. Level two represents the results of various tests. Level three represents the results of various measurements performed in a test, and level four represents the results for various datapoints for a given measurement. In summary, the levels of the hierarchy, starting from the highest level, are preferably, procedure, test, measurement, and datapoint. Preferably, the non-optimal results are summarized, and most preferably, the least optimal result is summarized. For example, if the possible results are "fail", "marginal", and "pass", with "fail" being the most non-optimal result, and "marginal" being more optimal than "fail" but less optimal than "pass", then "fail" is summarized over "marginal" and "marginal" is summarized over "pass". If no non-optimal result is found in a branch, then the optimal result is summarized up to the highest level. Preferably, the optimal result is "pass".

The electronic test output is displayed through an easy-to-use graphical user interface (GUI). The portion of the display containing the tree structure is preferably a small portion of the graphical user interface (GUI) where the results of the tests are preferably displayed as graphical elements. Preferably, the results are also displayed as textual elements.

Each level in the tree structure is, preferably, characterized by a graphical element. The graphical element provides the information on the status of the result at that level. Preferably, the graphical element consists of a single graphical element, such as an icon. Preferably, each icon is coded to indicate to the user the status of each result. Preferably, the code is an assigned symbol and/or a color. Preferably, each icon is colored to help the user instantly evaluate the outcome of each test. For example, the color red is assigned to a "fail" result.

Preferably, the tree structure also includes simple alphanumeric information describing the nature of each level. The alphanumeric characters are, for example, a text string providing the function or parameters of the level.

Preferably, as indicated above, the tree structure is an expandable tree structure. That is, when the tree structure displays only the main branches, the user activates a branch by clicking on the icon corresponding to that branch, and it expands by showing daughter branches which are sub-levels in the execution of the test program as previously mentioned. Similarly, by clicking again on a branch, the daughter branches are hidden and summarized on the next higher level.

The present invention not only provides an electronic test program that displays the overall output in a form that can be easily and quickly evaluated, but also displays the output in an intuitive manner which permits the user to quickly check individual results. Other features, objects and advantages of the invention will become apparent from the following description when read in conjunction with the accompanying drawings.

DETAILED DESCRIPTION OF THE PREFERRED EMBODIMENT

Figure 1:
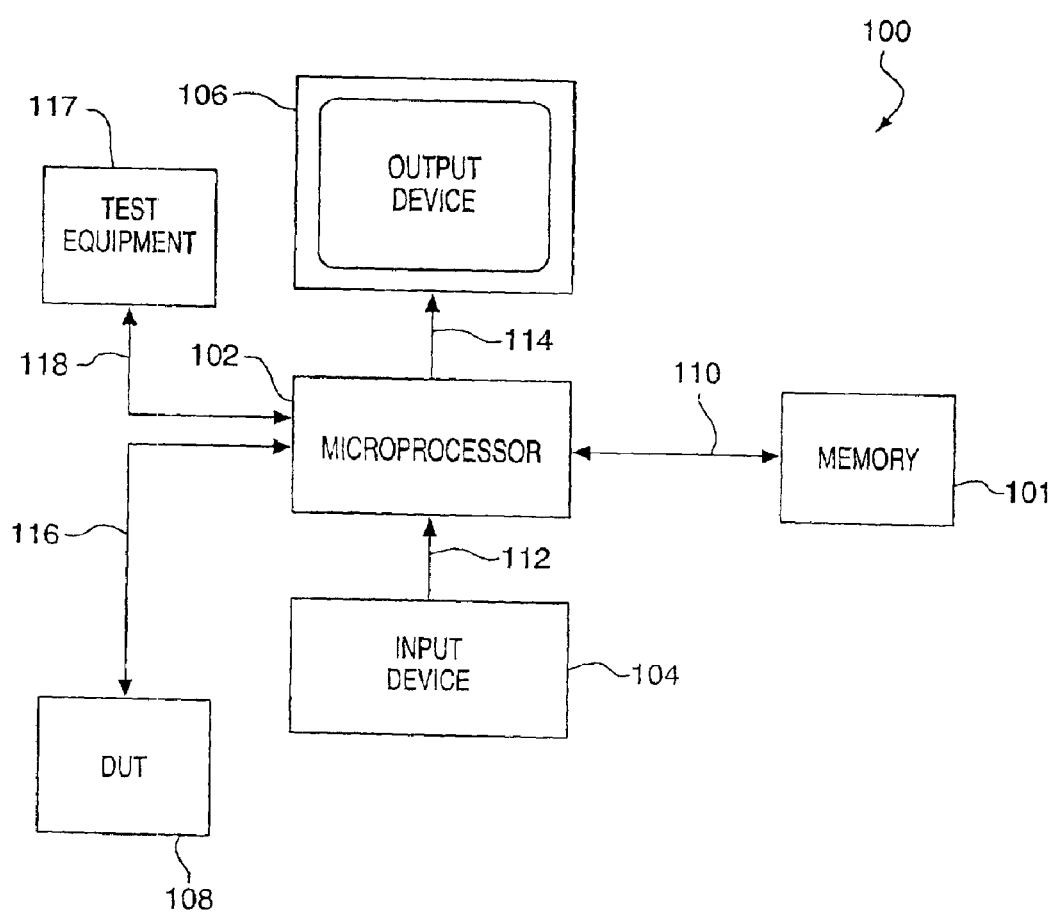
FIG. 1 is a block diagram showing the principal hardware components of the preferred embodiment of the present invention connected to a device under test.

The present invention relates to an electronic test system with a tree structure for summarizing results. Referring to FIG. 1 in the preferred embodiment, the test system preferably comprises a computer 100. Computer system 100 includes a memory 101, a microprocessor 102, an input device 104, and an output device 106. Memory 101 communicates with microprocessor 102 via electrical line 110. Input device 104 communicates with microprocessor 102 through electrical line 112. Microprocessor 102 outputs the data through output device 106 via electrical line 114.

In another embodiment, the test system can take the form of software stored in memory 101 and run or executed by processor 102. The user interacts with the test system through input device 104 such as, but not limited to, a keyboard, a mouse, a track ball, a touch pad, or a joystick. The input device 104 allows moving a cursor or a pointer on the output device 106, that is, a display system such as a cathode ray tube monitor or a liquid crystal display. The results of the test are displayed on the output device 106. The test is controlled by processor 102, which communicates the instructions of the test program to the product under test or device under test (DUT) 108 via electrical line 116. Processor 102 controls test equipment 117 via electrical line 118. The test results are processed by processor 102 and stored in memory 101 to be visualized by display 106. The display information contains both information as to the configuration and position of the cursor and other visual information of interest to the user such as the results of the test and how the test is progressing.

The invention may be implemented in a variety of actual electronic devices that follow the general form outlined on FIG. 1. For example, the test system may be embodied in a computer system, or it may also be embodied in the hardware as a logic circuit, or it may be embodied as an electronic testing device such as, but not limited to, an electronic analyzer. In some embodiments, no test equipment is required, so test equipment 17 is not present.

Figure 2:
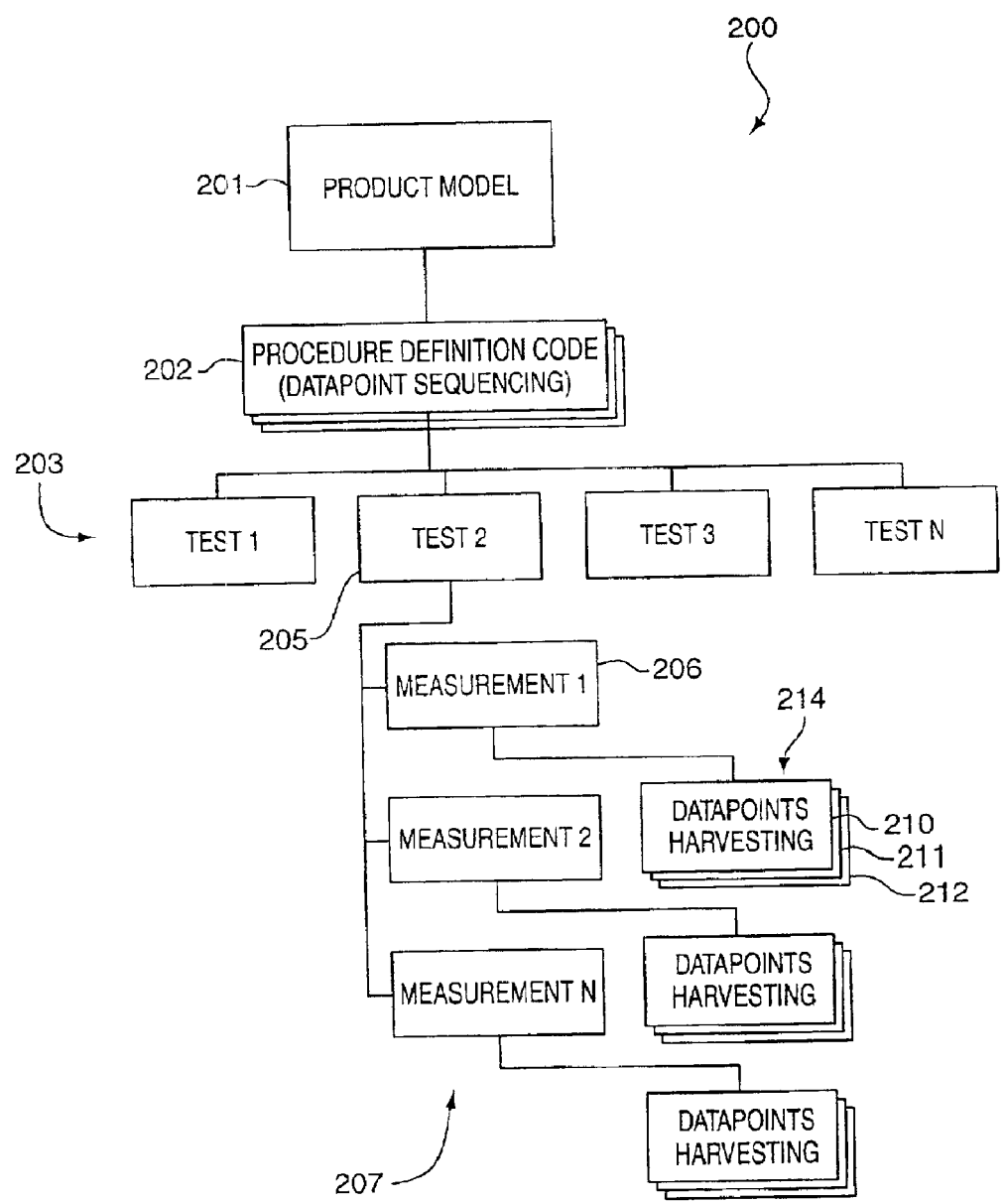
FIG. 2 is a block diagram showing the hierarchical structure of the preferred embodiment of a test program according to the invention.

To better understand the workings of the invention, it is helpful to describe the hierarchical structure of the preferred test program of the present invention and the order in which the test is performed. Referring to FIG. 2, there is shown a block diagram 200 illustrating the hierarchical, i.e., multi-level, characteristic of the test program. The first level 201 corresponds to the product model, a file the test developer creates to test a family of specific device model numbers. It contains test procedures and inputs.

The next level 202 corresponds to the procedure itself. A procedure is an ordered list, sequence, or script of tests to be run. Several procedures may exist, which is represented in FIG. 2 by a deck of cards 202, each representing a different procedure. Each procedure includes a plurality of tests, i.e., test 1, test 2, test 3 . . . test N, as shown at 203. Each test includes a plurality of measurements. This is illustrated in FIG. 2 for test 2 shown at 205. As shown, test 205 includes measurements 207, i.e., measurement 1, measurement 2 . . . . measurement N. Each measurement includes one or more datapoints, each datapoint represented as one of the cards 210, 211, 212 in a stack of cards 214 associated with each measurement. A procedure is defined by writing a program or a code to build a structure of software objects. In one embodiment, the software objects are Component Object Model (COM) objects. COM is a language-independent component architecture, not a programming language. It is meant to be a general purpose, object-oriented means to encapsulate commonly used functions and services. See Newton's Telecom Dictionary by Harry Newton, Publishers Group West, page 197.

A test 205 is a group of measurements 207 in a procedure 202 that share the same test algorithm or the same test software code. Some examples of tests include amplitude accuracy test, test of harmonic distortion, etc. The test program repeatedly calls a test for each measurement and datapoint.

A measurement, such as measurement 206, is a configuration or a set up for a test. Each measurement, in measurements 207, within a test 205 can have different setups or configuration parameters. Tests are parameter driven and the parameters are inputs at the measurement level. Measurements are elements such as range in volts, frequency in kilohertz or harmonic (an integer number). The test procedure 202 views the measurements 207 as data to be passed from the procedure to a test. A measurement is also a phase of test execution. During the measurement phase of test execution, the measurement is started but data is not collected. This allows for multiple devices under test (DUTs) to be configured and triggered together.

A datapoint, such as 210, 211, 212, is a subset of a measurement, such as 206, containing additional parameters that select a result when one measurement generates multiple results. Some examples of multiple datapoints for a measurement are the minimum and maximum of a spectrum analyzer sweep or each channel of a device.

For each datapoint, such as 210, in measurement 206, a value result is extracted. The results obtained are compared to specifications. Specifications are numerical limits, string match, or Boolean pass/fail. There are three sets of limits: marginal limits, production line limits, and customer limits. Each limit has an upper and a lower value.

Figure 3:
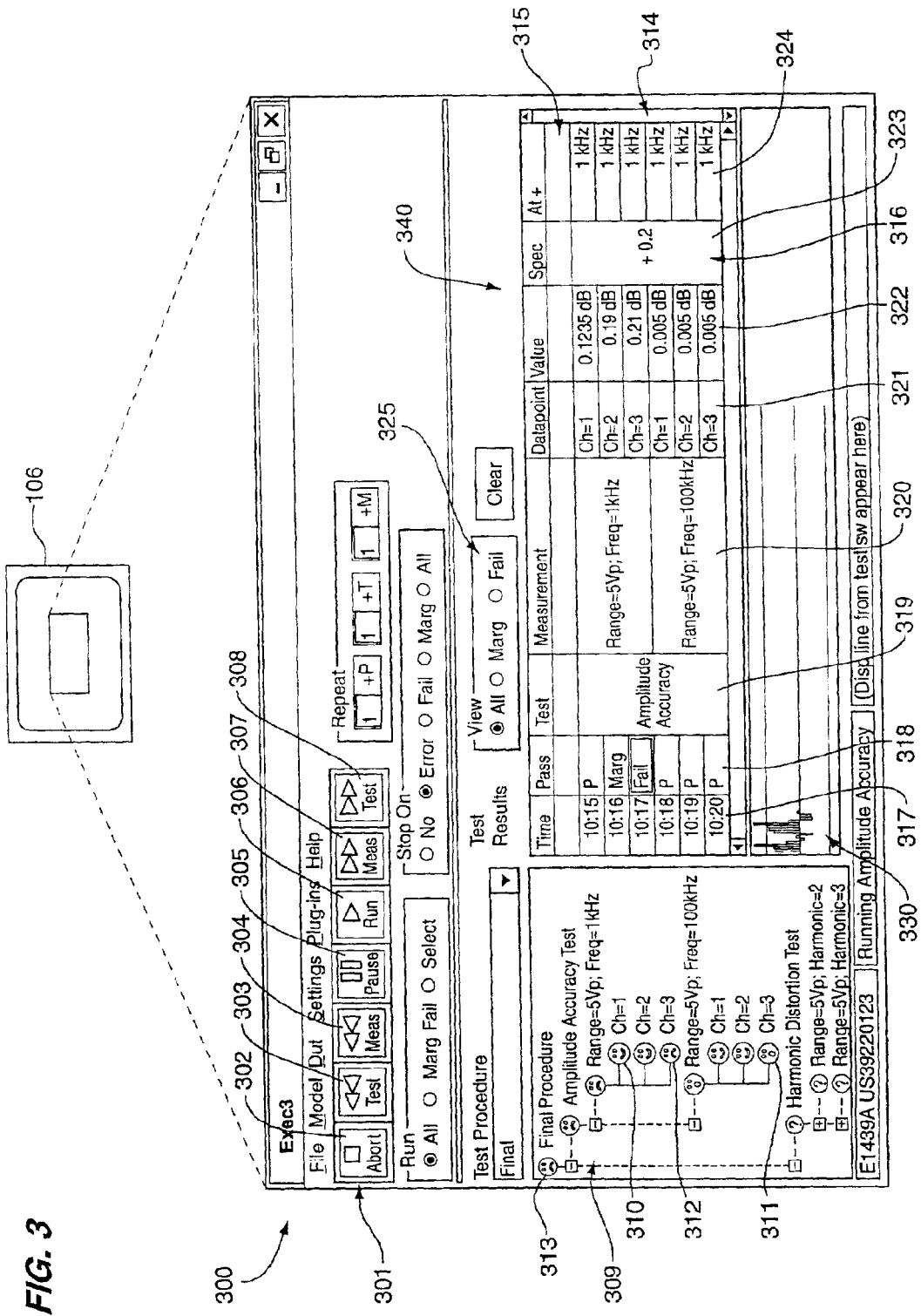
FIG. 3 shows a view of the graphical user interface of the electronic test system.

All the inputs and outputs of the electronic test system (FIG. 1) are handled preferably through a graphical user interface. FIG. 3 shows the graphical user interface 300 as displayed on the output device 106. The "tape recorder" type buttons 301 on the top left are used to control the test. From left to right, the buttons are: abort 302, restart test 303, restart measurement 304, pause 305, run 306, skip measurement 307, skip test 308.

The right side 314 of the graphical user interface 300 shows a window 340 comprising a series of rows, such as 315, and columns, such as 316. Window 340 displays the time 317 the test is run, as well as the status of the test 318. This window also displays the test that is being carried out, such as amplitude accuracy in 319, the type of measurement, such as (range=5 Vp, Frequency=1 kHz) in 320, the datapoint or channel under test, such as (Ch=1, Ch=2, Ch=3) in 321, the value or result of the measurement, such as (0.1235 dB) in 322, the specification, such as (±0.2) in 323, and the frequency, such as (1 kHz) in 324. The test results can be sorted by clicking on the "view" buttons in window 325 above the window 340. This allows either all the test results to be displayed, or permits the results to be filtered and displayed depending on their marginal or failed status. The bottom right window 330 is a progress window indicating the progress of the test procedure.

On the left side of the graphical user interface (GUI) 300, the preferred embodiment of a tree window 309 according to the present invention is shown. Window 309 includes a hierarchy of tests, measurements, and datapoints. Icons corresponding to the results indicate pass, fail, marginal and not-yet-tested. "Smiling" 310, "surprised" 311, and "sad" 312 icons correspond respectively to the pass, marginal, and fail status. The pass/fail icon 313 on top of the window is for the entire procedure. It summarizes the status of all the tests with "fail" having priority. That is, if there is one failed test, the whole procedure is fail. As discussed in more detail below, an algorithm that promotes the least optimal results is used to compute the final status of the procedure.

Figure 4:
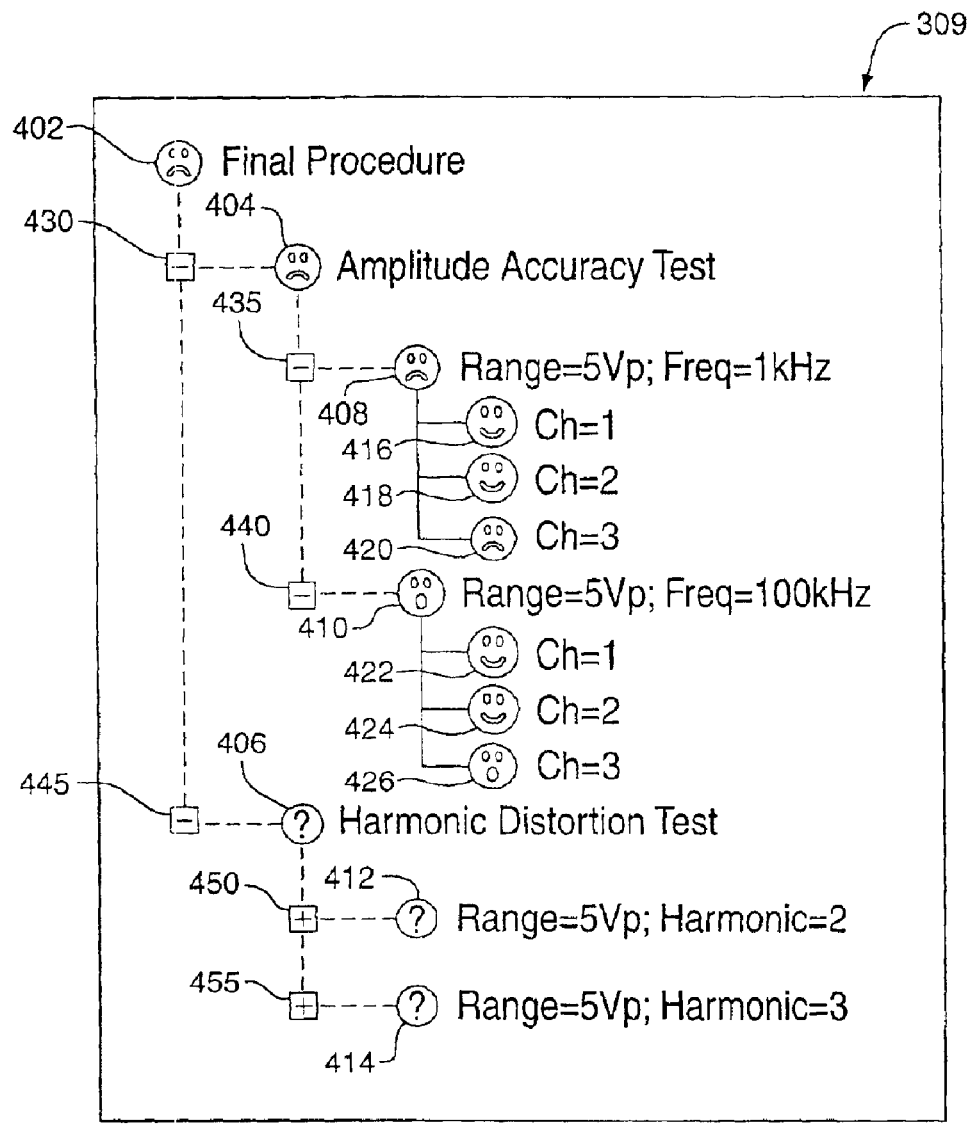
FIG. 4 shows a tree structure according to the invention.

An enlarged view of tree window 309 is shown in FIG. 4. The tree structure contains multiple levels with the first or highest level corresponding to the final test procedure shown with icon 402. This is considered the trunk of the tree structure. The second level in the execution of the test procedure comprises one or more tests, such as 408, each including one or more measurements, such as 408. In the embodiment shown, the second level includes two tests: an amplitude accuracy test shown with its corresponding result icon 404, and a harmonic distortion test shown with its result icon 406; this test level corresponds to the first generation branches extending from the trunk. The third level in the execution of a test represents the type of measurement itself, such as (range=5 Vp, Freq=1 Khz) with its corresponding result icon 408, (range=5 Vp, Freq=100 kHz) with its corresponding result icon 410, (range=5 Vp, Harmonic=2) with its corresponding result icon 412, and (range=5 Vp, Harmonic=3) with its corresponding result icon 414. This level corresponds to the second-generation branches in the tree. The fourth level in the execution of the test procedure represents datapoints, such as (Ch=1, Ch=2, Ch=3) with their respective result icons 416, 418, and 420, associated with the datapoints (Ch=1, Ch=2, Ch=3) being sub-levels of measurement 408, and respective result icons 422, 424, 426 associated with the (Ch=1, Ch=2, Ch=3) datapoints being sub-levels of measurement 410. This level corresponds to the third-generation branches in the tree.

Preferably, the tree structure 309 is expanded or retracted by "clicking" on a "+" or "−" sign next to the icon corresponding to the result for each level, such as the "−" sign 430 next to result icon 404, the "−" sign 435 next to result icon 408, the "−" sign 440 next to result icon 410, the "−" sign 445 next to result icon 406, etc. Initially, the tree structure is preferably retracted to only display the trunk; that is, the result for the final test procedure 402 and the results for the first-generation branches, such as 404 and 406, respectively, amplitude accuracy test and harmonic distortion test. If the sign next to the result icon is "+", such as 450 and 455, this means that daughter branches, i.e., sub-levels, are not displayed. However, the user can activate the tree structure in order to show more detail as to where each branch leads by "clicking" on the "+" sign next to the result for the parent branch. If the sign next to the result icon is "−", such as 430, 435, 440, 445, this means that daughter branches are displayed and the user can expand further the tree to explore next generation branches.

As previously mentioned, the result for each level or branch in the tree structure is indicated by an easily readable icon. Preferably, a "smiling face", such as 416, is selected to indicate a "pass" result, a "sad face", such as 404, is selected to indicate a "fail" result, a "surprised face", such as 410, is selected to indicate a "marginal" result, and a "?" is selected to indicate a "not-yet-tested" result. Most preferably, each result icon is color coded to indicate the status of the result. For example, the color green is assigned to a "pass" result, the color red is assigned to a "fail" result, the color yellow is assigned to a "marginal" result, and no color is assigned to a "not-yet-tested" result.

Preferably, the result for a level is determined by applying an algorithm where the least optimal result, e.g., "fail" is given precedence over optimal results, e.g., "pass".

Another way of expressing the summarizing function is that, in the tree structure, the results are summarized to the higher levels. That is, if a test fails at a datapoint level, for example, that failure is shown at the measurement level, the test level, and the procedure level. The user can investigate where a fail result originated by following the results in each branch directly connected to the shown result. In practical terms, for example, the user sees a fail result in final procedure 402 and would like to investigate where the fail result originated. The user opens the first generation branches 404 and 406. Icon 404 shows a fail result and icon 406 a not-yet-tested result. Therefore, the user decides to look further along the branch where the fail in icon 404 originated. The user opens 404 by clicking on the "+" sign next to it to show daughter branches 408 and 410. Icon 410 shows a marginal result and icon 408 shows a fail result. Therefore, the user opens branch 408 to show results 416, 418, and 420. The user sees a fail result at 420. The user, therefore, determined that the fail result originated from a fail result in 420, that is, a fail result in datapoint (Ch=3) under measurement (range=5 Vp, Freq=1 kHz) under amplitude test accuracy.

Figure 5:
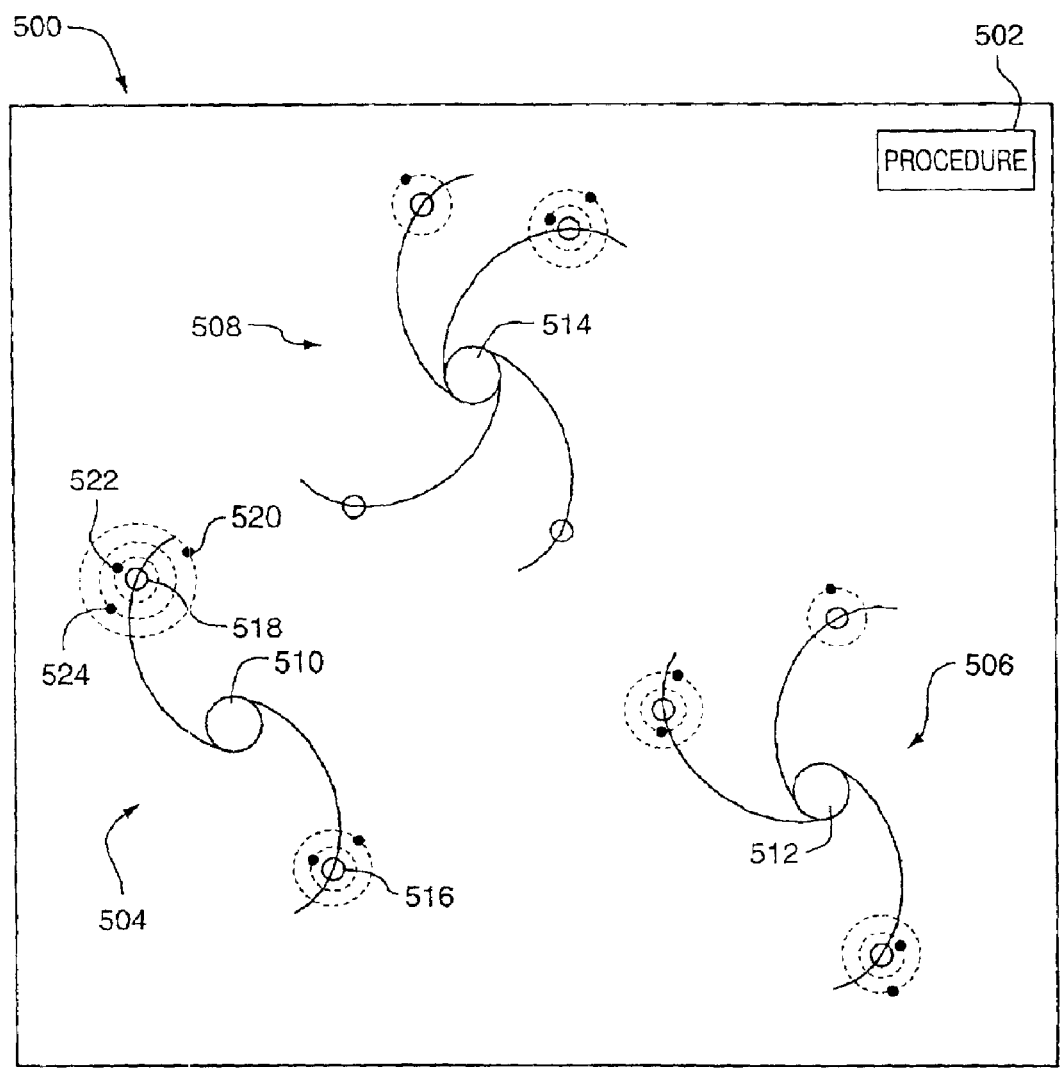
FIG. 5 shows an alternative embodiment of a tree structure according to the invention.

FIG. 5 shows an alternative embodiment of a tree window 500 according to the present invention. Referring to FIG. 5, 500 represents another form for a tree structure wherein the trunk of the tree, also called the first level, is displayed as the cosmic universe shown with its corresponding result icon 502. The second level in the execution of the test procedure is a test. This level is displayed as a galaxy, such as 504, 506, and 508. The icon 510 at the center of galaxy 504, the icon 512 at the center of galaxy 506, and the icon 514 at the center of galaxy 508 represent the results at the test level. The third level in the execution of a test procedure represents the measurement itself with its corresponding result icons, such as 516 and 518 in test 504. This level is represented by stars displayed as circular icons such as 516 and 518 in the arms of galaxy 504. The fourth level in the execution of the test procedure represents datapoints in a measurement, with their result icons such as 520, 522, and 524 in measurement 518. This level is displayed as planets such as 520, 522, and 524 gravitating around star 518. The size of the icons representing the results at each level increases with the hierarchy in the test. For instance, the icon 510 corresponding to the result at the test level is bigger that the icon 518 corresponding to the result at the measurement level. Furthermore, as described previously, icons are coded to indicate pass, marginal, fail, or not-yet-tested results at each level in the execution of the test procedure. The result for the whole test procedure is also color coded and displayed on the icon 502. The user can instantly detect and locate where a fail result originated by looking at this picture "universe".

There has been described what at present is considered to be the preferred embodiment of the invention. It will be understood that the invention can be embodied in other specific forms without departing from its spirit or essential characteristics. For example, while the invention has been described in terms of an electronic test program with a tree structure, other systems may be implemented based on hardware or firmware instead of software. The program can, for instance, sit on a programmed processor or other platform. In addition, more than one tree structure can be added to the graphical user interface to display the test results of two or more devices under test. The tree structure may be displayed in other forms, such as where the results at each level of the tree structure may be grouped in another form such as a cosmic universe containing galaxies which in turn contain stars which contain planets. The present embodiment is, therefore, to be considered as illustrative and not restrictive. The scope of the invention is indicated by the appended claims.

What is claimed is:

1. An electronic test system comprising:
   a memory for storing validation tests and test results for a product under test;
   an electronic processor, communicating with said memory, for controlling the execution of said tests and causing display of said test results; and
   an output device, communicating with said electronic processor, for displaying a graphical user interface, the graphical user interface including a multiple level tree structure in which i) said test results are grouped and displayed by test type, and ii) results of each sub-level are summarized at a next higher level of the tree structure.

2. An electronic test system as in claim 1 wherein each said level in said tree structure is summarized by a graphical element.

3. An electronic test system as in claim 2 wherein said graphical element is an icon representing the status of the result at each said level.

4. An electronic test system as in claim 3 wherein alphanumeric characters are associated with said icon.

5. An electronic test system as in claim 3 wherein said status is one of the following states: pass, fail, marginal, and not-yet-tested.

6. An electronic test system as in claim 5 wherein said icon includes a code selected from the group consisting of symbols, alphanumeric characters, designs and colors.

7. An electronic test system as in claim 6 wherein said icon is color coded to indicate the status of said result.

8. An electronic test system as in claim 7 wherein the color green is assigned to a pass result, the color yellow is assigned to a marginal result, the color red is assigned to a failed result, and no color is assigned to a not-yet-tested result.

9. An electronic test system as in claim 6 wherein said icon is design coded to indicate the status of said result.

10. An electronic test system as in claim 9 wherein a "smiling face" icon is assigned to a pass result, a "surprised face" icon is assigned to a marginal result, a "sad face" icon is assigned to a failed result, and a "question mark" icon is assigned to not-yet-tested result.

11. An electronic test system as in claim 1 wherein each said level includes an alphanumeric string of characters designating the function of each said level.

12. An electronic test system as in claim 1 wherein said levels include a test procedure level, and a test type level which is a sub-level of said test procedure level.

13. An electronic test system as in claim 12 wherein said test procedure level is said highest level, equivalent to a trunk in said tree structure, and said test type sub-level is equivalent to a first generation branch in said tree structure.

14. An electronic test system as in claim 13 wherein said tree structure further comprises measurement sub-level equivalent to a second generation branch in said tree structure.

15. An electronic test system as in claim 14 wherein said tree structure further comprises datapoint sub-level equivalent to a third generation branch in said tree structure.

16. An electronic test system as in claim 1 wherein said tree structure is expandable to display said one or more sub-levels.

17. An electronic test system as in claim 1 wherein the least optimal result at each said sub-level is summarized to the next higher level.

18. A method for displaying the results of electronic tests comprising the steps of:
   performing a test procedure including validation tests on a product under test, to determine a plurality of test results;
   displaying said test results in a multiple level tree structure wherein said test results are grouped and displayed by test type; and
   summarizing said test results of each said sub-level at a next higher level of the tree structure.

19. A method as in claim 18 wherein said step of displaying comprises displaying a plurality of icons, each of said icons corresponding to one of said test results.

20. A method as in claim 19 wherein said step of displaying comprises displaying a text string in each said level, said text string defining the function of each said level.

21. A method as in claim 19 wherein said step of displaying comprises a step of assigning a code to said result according to whether the status of said result is pass, fail, marginal, or not-yet-tested.

22. A method as in claim 21 wherein said step of assigning comprises a step of selecting a code from the group consisting of symbols, designs, colors, and alphanumeric characters.

23. A method as in claim 22 wherein said step of assigning comprises assigning the color green to said pass result, assigning the color yellow to said marginal result, assigning the color red to said fail result, and assigning no color to said not-yet-tested result.

24. A method as in claim 22 wherein said step of assigning comprises assigning a "smiling face" icon to said pass result, assigning a "surprised face" icon to said marginal result, assigning a "sad face" icon to said fail result, and assigning a "question mark" icon to said not-yet-tested result.

25. A method as in claim 18 wherein the step of displaying further comprises displaying a tree structure with said highest level corresponding to said result of said test procedure.

26. A method as in claim 25 wherein the step of displaying further comprises displaying a tree structure with said sub-level directly below said test procedure level corresponding to the result of a test in said test procedure.

27. A method as in claim 26 wherein the step of displaying further comprises displaying a tree structure with said sub-level directly below said test level corresponding to the result of a measurement in said test.

28. A method as in claim 27 wherein the step of displaying further comprises displaying a tree structure with said sub-level directly below said measurement level corresponding to the result for a datapoint in said measurement.

29. A method as in claim 18, further comprising the step of expanding said tree structure to display said one or more sub-levels.

30. A method as in claim 18 wherein said step of summarizing comprises determining the result displayed at a higher level by summarizing said results at said sub-level directly below said higher level.

31. A method as in claim 18 wherein said step of summarizing corresponds to summarizing the least optimum results at said sub-levels to said higher level.

* * * * *